United States Patent
Kuribayashi et al.

(10) Patent No.: US 7,129,668 B2
(45) Date of Patent: Oct. 31, 2006

(54) ACTUATOR CONTROL UNIT

(75) Inventors: Nobukazu Kuribayashi, Kariya (JP); Masahiko Sugaya, Anjo (JP); Akira Yamaguchi, Chiryu (JP); Tokuhisa Takeuchi, Chita-gun (JP); Daizou Koumura, Nagoya (JP); Shinji Wakao, Okazaki (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/944,957

(22) Filed: Sep. 20, 2004

(65) Prior Publication Data
US 2005/0077858 A1  Apr. 14, 2005

(30) Foreign Application Priority Data
Oct. 10, 2003  (JP) ............... 2003-352523

(51) Int. Cl.
G05B 11/32  (2006.01)
B60H 1/00  (2006.01)

(52) U.S. Cl. ............ 318/625; 318/479; 318/630; 318/632

(58) Field of Classification Search ........ 318/479, 318/638, 466, 772, 786; 307/10.2, 10.1; 236/13, 51, 75, 49.3; 180/287; 701/1, 29, 701/36
See application file for complete search history.

(56) References Cited

U.S. PATENT DOCUMENTS

| | | | | |
|---|---|---|---|---|
| 4,659,104 A * | 4/1987 | Tanaka et al. | ............ | 280/6.158 |
| 4,947,392 A * | 8/1990 | Wada | ............ | 714/55 |
| 5,224,124 A * | 6/1993 | Hamano et al. | ............ | 375/259 |
| 5,353,685 A * | 10/1994 | Snow | ............ | 91/459 |
| 5,744,874 A * | 4/1998 | Yoshida et al. | ............ | 307/10.1 |
| 5,803,355 A * | 9/1998 | Ureshino et al. | ............ | 236/13 |
| 5,890,078 A * | 3/1999 | Furuta | ............ | 701/1 |
| 5,896,418 A * | 4/1999 | Hamano et al. | ............ | 375/259 |
| 5,902,180 A | 5/1999 | Sunaga et al. | | |
| 5,990,570 A * | 11/1999 | Yoshida et al. | ............ | 307/10.1 |
| 6,037,675 A * | 3/2000 | Yoshida et al. | ............ | 307/10.2 |
| 6,157,091 A * | 12/2000 | Yoshida et al. | ............ | 307/10.1 |
| 6,163,082 A * | 12/2000 | Yoshida et al. | ............ | 307/10.1 |
| 6,169,337 B1 * | 1/2001 | Yoshida et al. | ............ | 307/10.1 |
| 6,294,845 B1 * | 9/2001 | Yoshida et al. | ............ | 307/10.6 |
| 6,307,279 B1 * | 10/2001 | Yoshida et al. | ............ | 307/10.1 |
| 6,534,883 B1 * | 3/2003 | Yoshida et al. | ............ | 307/10.1 |
| 6,615,119 B1 * | 9/2003 | Shimizu | ............ | 701/29 |
| 6,625,522 B1 * | 9/2003 | Sakurai et al. | ............ | 701/1 |
| RE38,338 E * | 12/2003 | Yoshida et al. | ............ | 307/10.2 |
| 6,801,007 B1 * | 10/2004 | Takeuchi et al. | ............ | 318/479 |
| 2001/0054847 A1 * | 12/2001 | Yoshida et al. | ............ | 307/10.1 |
| 2002/0029098 A1 * | 3/2002 | Sakurai et al. | ............ | 701/1 |
| 2003/0052180 A1 * | 3/2003 | Huhn et al. | ............ | 236/49.3 |
| 2003/0195669 A1 * | 10/2003 | Sakurai et al. | ............ | 701/1 |
| 2004/0004457 A1 * | 1/2004 | Takeuchi et al. | ............ | 318/638 |
| 2004/0012357 A1 * | 1/2004 | Takeuchi et al. | ............ | 318/479 |
| 2004/0054429 A1 * | 3/2004 | Doi et al. | ............ | 700/79 |

FOREIGN PATENT DOCUMENTS

JP  10-138742  5/1998

* cited by examiner

Primary Examiner—Paul Ip
(74) Attorney, Agent, or Firm—Harness, Dickey & Pierce, PLC

(57) ABSTRACT

An actuator control device includes an electrical control unit for detecting the present positions of output shafts of servo motors, and communicating with control circuits for driving the output shafts of the servo motors to target stop positions on the basis of the present positions thus detected. When it is judged that a present position of one of the output shafts thus receives is abnormal, the electrical control unit corrects the present position and transmits the corrected present position to the appropriate control circuit.

19 Claims, 11 Drawing Sheets

FIG. 9

| PATTERN NO | 1 | 2 | 3 | 4 | 1 | 2 | 3 | 4 |
|---|---|---|---|---|---|---|---|---|
| A-PHASE INPUT | 0 | 0 | 1 | 1 | 0 | 0 | 1 | 1 |
| B-PHASE INPUT | 0 | 1 | 1 | 0 | 0 | 1 | 1 | 0 |
| COUNT DIRECTION (PULSE INCREASE) | ● | +1 | +1 | +1 | +1 | +1 | +1 | +1 → |
| COUNT DIRECTION (PULSE DECREASE) | ← −1 | −1 | −1 | −1 | −1 | −1 | −1 | ● |

FIG. 10

| PRESENT POSITION LOWER TWO BITS | PULSE STATE A | PULSE STATE B |
|---|---|---|
| 00 | 0 | 1 |
| 01 | 1 | 1 |
| 10 | 1 | 0 |
| 11 | 0 | 0 |

FIG. 11

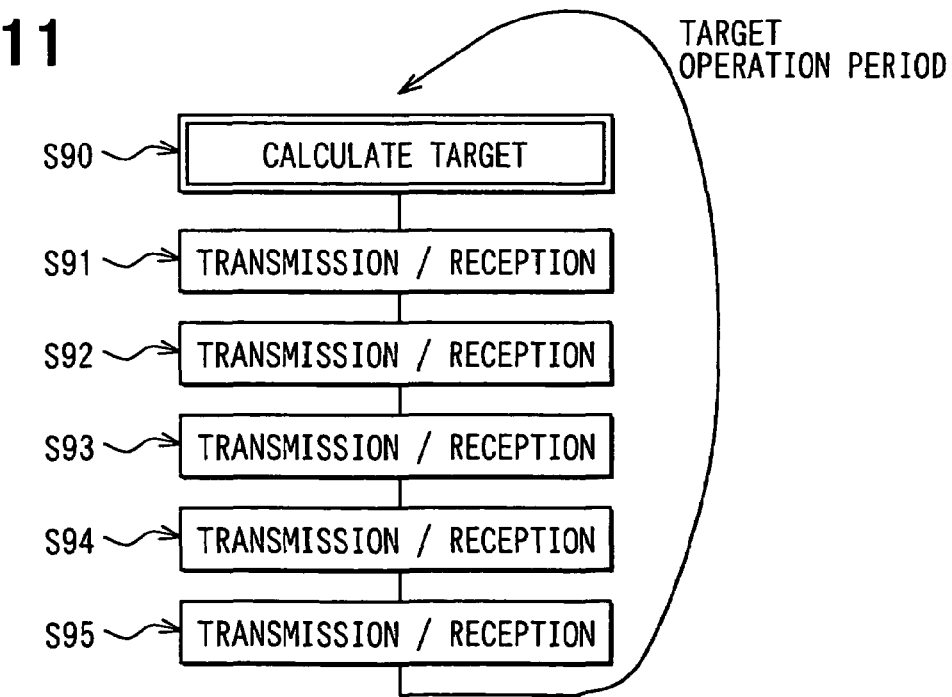

S90 → CALCULATE TARGET
S91 → TRANSMISSION / RECEPTION
S92 → TRANSMISSION / RECEPTION
S93 → TRANSMISSION / RECEPTION
S94 → TRANSMISSION / RECEPTION
S95 → TRANSMISSION / RECEPTION

TARGET OPERATION PERIOD

FIG. 16

| PRESENT POSITION LOWER TWO BITS | | READ-OUT PULSE STATE | | PRESENT POSITION CORRECTION AMOUNT |
|---|---|---|---|---|
| | | A | B | |
| 0 | 0 | 0 | 0 | −1 |
| | | 0 | 1 | ±0 |
| | | 1 | 1 | +1 |
| | | 1 | 0 | +2 |
| 0 | 1 | 0 | 0 | +2 |
| | | 0 | 1 | −1 |
| | | 1 | 1 | ±0 |
| | | 1 | 0 | +1 |
| 1 | 0 | 0 | 0 | +1 |
| | | 0 | 1 | +2 |
| | | 1 | 1 | −1 |
| | | 1 | 0 | ±0 |
| 1 | 1 | 0 | 0 | ±0 |
| | | 0 | 1 | +1 |
| | | 1 | 1 | +2 |
| | | 1 | 0 | −1 |

ACTUATOR CONTROL UNIT

CROSS REFERENCE TO RELATED APPLICATION

This application is based upon, claims the benefit of priority of, and incorporates by reference the contents of Japanese Patent Application No. 2003-352523 filed on Oct. 10, 2003.

FIELD OF THE INVENTION

The present invention relates to an actuator control unit which communicates with a plurality of control circuits for controlling a plurality of actuators, respectively.

BACKGROUND OF THE INVENTION

A conventional vehicle air conditioning unit, such as that disclosed in, for example, JP-A-10-138742, includes actuators for rotationally driving various kinds of doors, such as, for example, an air mix door, through output shafts. Control circuits respectively detect the present position of each output shaft and control each actuator based on the detected position to drive each output shaft to a target stop position. The vehicle air conditioning unit also includes an electrical control unit which communicates with each control circuit to transmit a target stop position for each actuator.

As mentioned above, each control circuit of the vehicle air conditioning device drives the output shaft to the target stop position based on its present position. Accordingly, each control circuit is required to recognize the accurate present position of the output shaft in order to drive the output shaft to the target stop position at high precision.

However, electrical noise resulting from, for example, electromagnetic waves may cause the control circuit to malfunction and erroneously reset the memory or garble data when information on the present position is received. The present position recognized by the control circuit then becomes deviated from the actual present position.

That is, the present position recognized by the control circuit is made abnormal by the effect of the electrical noise. When the control circuit controls the actuator based upon an abnormal present position, the control circuit drives the output shaft to a position out of the original target stop position. This may induce lock or the like and thus cause the actuator to be uncontrollable.

SUMMARY OF THE INVENTION

Therefore, an object of the present invention is to keep an actuator from being made uncontrollable in an electrical control unit which communicates with respective control circuits for controlling a plurality of actuators.

In order to attain the above object, according to a first aspect of the present invention, an actuator control device for controlling the positions of output shafts of a plurality of actuators through control circuits corresponding to the respective actuators by an electrical control unit, comprises:

a plurality of actuators for driving the output shafts by a motor;

a plurality of control circuits for detecting the respective present positions of the output shafts of the plural actuators and driving the output shafts of the plural actuators to respective target stop positions on the basis of the respective present positions thus detected; and an electrical control unit which carries out multiplex communications with the control circuits through a multiplex communication line, wherein the electrical control unit comprises a receiving unit for receiving the present positions from the plural control circuits through the multiplex communication line before the plural control circuits drive the respective actuators, a judging unit for judging whether each of the respective present positions thus received is abnormal or not, and a transmitting unit for correcting some present position out of the received present positions when it is judged by the judging unit that the present position concerned is abnormal, and transmitting the corrected present position to the control circuit corresponding to the abnormal present position out of the control circuits through the multiplex communication line.

As described above, in the actuator control unit, when it is judged by the judging unit that some present position is abnormal, the abnormal present position is corrected and transmitted to the control circuit. Therefore, the control circuit concerned can drive the output shaft of the corresponding actuator to the target stop position on the basis of the present position thus corrected, and thus the actuator concerned can be prevented in advance from being uncontrollable.

According to a second aspect of the present invention, in the actuator control device of the first aspect, the electrical control unit contains therein a transmission unit with which when it is judged by the judging unit that some present position out of the received present positions is a normal present position, the target stop position is transmitted to the control circuit corresponding to the normal present position while the multiplex communications with the other control circuits than the control circuit corresponding to the normal present position are stopped immediately after the judgment.

Accordingly, the control circuit corresponding to the normal present position (hereinafter referred to as "normal control circuit") can quickly drive the output shaft of the corresponding actuator to the target stop position.

Furthermore, according to a third aspect of the present invention, in the actuator control device of the first aspect, each actuator outputs two pulse signal sequences displaced in phase in connection with the driving of the output shaft thereof, and the plural control circuits counts variation of the two pulse signal sequences output from each actuator and determines the present position comprising the count value.

According to a fourth aspect of the present invention, in the actuator control device of the third aspect, the receiving unit may also receive a pulse state of the two pulse signals at the present time from the plural control circuits in addition to the present position, and on the basis of the relationship between the present position comprising the count value and the pulse state of the two pulse signals the judging unit may make a judgment as to whether the respective present positions received from the plural control circuits are abnormal or not.

More specifically, according to a fifth aspect of the present invention, in the actuator control device of the fourth aspect, the electrical control unit contains therein a storage unit for storing the relationship between the pulse state of the two pulse signals and the value of a predetermined digit at a lower side of the count value indicating the present position when the present position is normal, and the judging unit judges whether the present position comprising the count value received from each control circuit and the pulse state of the two pulse signals satisfy the relationship indicated in the storage data of the storage unit, thereby judging whether present position information received from each control circuit is abnormal or not.

As for judgment whether the present position is normal or not, that of the sixth aspect of the invention may be employed other than that of the fourth aspect.

According to a sixth aspect of the present invention, in the actuator control device of the third aspect, the receiving unit receives the present position comprising the count value from each control circuit every predetermined period, and when the difference between a currently-received present position from a prescribed control circuit out of the plural control circuits and a previously-received present position from the prescribed control circuit is larger than a fixed value, the judging unit judges that the currently-received present position from the prescribed control circuit is abnormal.

Accordingly, the judging unit can judge abnormality or normality of the present position on the basis of only the present positions received from the control circuits without using the two pulse signals.

According to a seventh aspect of the present invention, in the actuator control device of the sixth aspect, the judging unit periodically judges whether the difference between a currently-received present position from a prescribed control circuit out of the plural control circuits and a previously-received present position is larger than a predetermined value, and the predetermined value is determined on the basis of the predetermined period of the reception of the present position by the receiving unit and the maximum speed of the output shafts of the plural actuators.

According to an eighth aspect of the present invention, in the actuator control device of the first aspect, when the present position received from a prescribed control circuit out of the plural control circuits is out of a predetermined range, the judging unit judges that the present position received from the prescribed control circuit is abnormal.

The correction of the present position may be made as following.

According to a ninth aspect of the present invention, in the actuator control device of the fourth aspect, the actuator control device is equipped with a storage unit for storing data indicating the corresponding relationship of the value of a predetermined digit at a lower side out of the present position comprising the count value, the pulse state of the two pulse signals and a correction amount of the present position, and when the judging unit judges that the present position received from a prescribed control circuit out of the plural control circuits is abnormal, the transmitting unit determines the correction amount on the basis of the present position received from the prescribed control circuit, the pulse state of the two pulse signals and the data stored in the storage unit, corrects the present position comprising the count value on the basis of the correction amount thus determined and transmits the corrected present position to the prescribed control circuit.

According to a tenth aspect of the present invention, in the actuator control device of the first aspect, the plural actuators drive a plurality of doors equipped to an air conditioning unit for air-conditioning a room by driving the output shafts thereof.

In a case where a present position is judged to be abnormal in a control circuit, if the control circuit drives the corresponding actuator without initializing the actuator, lock or the like would occur in the actuator and thus the actuator may be made uncontrollable.

Initialization means that the output shaft of the actuator is driven to the original position and then the location of the output shaft at the original position is memorized.

Therefore, if the present position is judged to be abnormal, it is preferable to initialize the actuator. In order to initialize the actuator, the air conditioning unit is required to be temporarily stopped. Therefore, when the initialization is carried out, the air conditioning operation of the air conditioning unit is stopped, and thus a user may feel uncomfortable.

Therefore, according to an eleventh aspect of the present invention, in the actuator control device of the tenth aspect, each of the plural control circuits is equipped with an initializing unit for driving the output shaft of each actuator to an original position and memorizes that the output shaft is located at the original position, and the actuator control device is equipped with an instructing unit for instructing a prescribed control circuit out of the plural control circuits to actuate the initializing unit after the air conditioning of the air conditioning unit is stopped when the judging unit judges that a specific present position out of the received present positions is abnormal.

In this case, some control circuit initializes the actuator after the air conditioning operation of the air conditioning unit is stopped, so that it is not required to stop the air conditioning unit and thus the user can be kept from feeling uncomfortable.

According to a twelfth aspect of the present invention, in the first aspect of the actuator control device, the control circuits are equipped to every servo motor, and the electronic control unit and the servo motors are connected to each other through a time-divisional multiplex communication line, a power supply line and a ground line.

According to a thirteenth aspect of the actuator control device, in the third aspect of the actuator control device, each of the actuators is equipped with a pulse pattern plate, the pulse pattern plate contains first and second pulse patterns comprising conductive portions and non-conduction portions which are alternately arranged in the circumferential direction, and it is rotated integrally with the output shaft to output the two pulse signal sequences.

According to a fourteenth aspect of the present invention, in the thirteenth aspect of the actuator control device, the control circuit has a motor driving circuit for driving the motor, a rotational angle detector for detecting a rotational angle serving as the present position of the output shaft on the basis of pulse signals generated in the pulse pattern plate, a storage circuit (memory) for storing various kinds of control information, and a communication circuit communicating with the electrical control unit through the multiplex communication line.

According to a fifteenth aspect of the present invention, in the fourteenth aspect of the present invention, first and second brushes and the pulse pattern plate constitute a pulse generator for generating the pulse signal sequences comprising a first pulse pattern and a second pulse pattern every time the output shaft rotates by a predetermined angle, and a two-phase first-phase pulse generated by the first pulse pattern and the first brush and a two-phase second-phase pulse which is generated by the second pulse pattern and the second brush and displaced in phase from the first-phase pulse in the pulse occur in the pulse generator.

According to a sixteenth aspect of the present invention, in the fifth aspect of the actuator control device, the present position of the output shaft is renewed on the basis of a switching operation of the state of the two pulse signal sequences, and the count value serving as the present position is incremented one by one every time the state of the two pulse signal sequences is changed in the following order [0,1]→[1,1]→[1,0]→[0,0]→[0,1]→ . . .

According to a seventeenth aspect of the present invention, in the sixteenth aspect of the actuator control device, when the state of the two pulse signal sequences is changed in the following order: [0,1]→[1,1]→[1,0]→[0,0]→[0,1], predetermined two digits of the present position comprising the count value is changed in the following order: [00]→[01]→[10]→[11]→[00], and the state of the two pulse signal sequences and the predetermined two digits of the present position have a predetermined corresponding relationship insofar as the present position comprising the count value is a normal value.

According to an eighteenth aspect of the present invention, in the seventeenth aspect of the actuator control device, the electrical control circuit determines the correction amount of the present positions on the basis of the storage data (a table of FIG. 16) in the storage unit; the present position of the count value and the pulse state of the two pulse signal sequences when the present position information is judged to be abnormal; predetermined digits of the present position, the present pulse state and the correction amount are associated with one another in the storage data; the correction amount is determined by selecting one correction amount of the present position on the basis of the storage data; the correction amount thus determined is added to the present position comprising the count value to correct the present position; and the present position thus corrected is transmitted to the control circuit.

BRIEF DESCRIPTION OF THE DRAWINGS

FIG. 9 is a diagram showing a pulse state of pulse signals generated from a pulse generator;

FIG. 10 is a table showing the relationship between the pulse state of A-phase, B-phase and lower two digits of the present position;

FIG. 11 is a flowchart showing the control processing of the electrical control unit of FIG. 1;

FIG. 16 is a table showing the transmission/reception processing of the electrical control unit of FIG. 1.

DETAILED DESCRIPTION OF THE PREFERRED EMBODIMENTS

Figure 1:
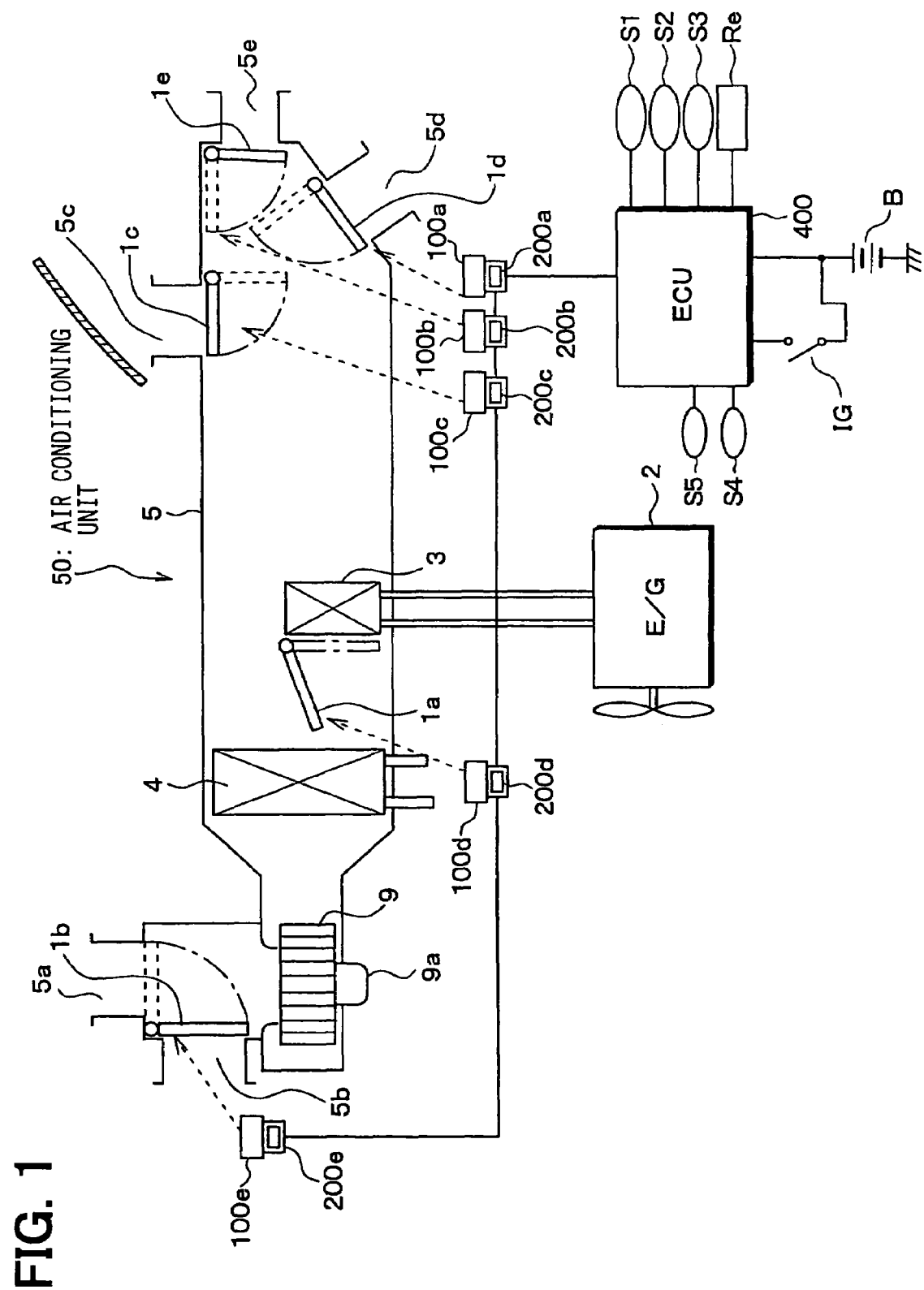
FIG. 1 is a schematic diagram showing a vehicle air conditioner according to a preferred embodiment.

Preferred embodiments according to the present invention will be described hereunder with reference to the accompanying drawings.

The reference numerals in parenthesis of each means (units) show the relationship of concrete means described in the embodiments described below.

Referring to FIG. 1, an overall construction of a vehicle air conditioner to which an electrical control unit of the present invention is applied will be discussed.

The vehicle air conditioner is equipped with an air conditioning unit 50 that has a case 5 and is accommodated in a dashboard panel. In the air conditioning case 5, an indoor/outdoor air switching door 1*b* is rotatably mounted in the case 5. The door 1*b* is switched to a first switching position (a position indicated by a solid line in FIG. 1) under the driving of a servo motor 100*e* to introduce outdoor air from an outdoor air introducing port 5*a* into the air conditioning case 5.

The indoor/outdoor air switching door 1*b* is switched to a second switching position (a position indicated by a broken line of FIG. 1) under the driving of the servo motor 100*e* to introduce air in the vehicle (indoor air) from an indoor air introducing port 5*b* into the air conditioning case 5.

A blower 9 blows the outdoor air from the outdoor air introducing port 5*a* or the indoor air from the indoor air introducing port 5*b* as an air stream to an evaporator 4 in accordance with the rotational speed of a blower motor 9*a*. The evaporator 4 cools the air stream blown out from the blower 9 with refrigerant which is circulated by actuation of a well-known refrigerating cycle.

An air mix door (A/M door) 1*a* is driven by a servo motor 100*d* to distribute the cooled air stream blown out from the evaporator 4 into an air stream to flow into a heater core 3 and an air stream bypassing the heater core 3 (hereinafter referred to as "bypass cooled air stream").

The air stream to flow into the heater core 3 is heated by engine cooling water (hot water) in the heater core 3, and thus hot air is blown out from the heater core 3. In connection with this operation, the hot air blown out from the heater core 3 and the bypass cooled air stream are mixed with each other, and flow to blow-out port doors 1*c*, 1*d* and 1*e*. The mixture ratio SW (%) of the hot air and the bypass cooled air stream is determined by an opening degree of the air mix door 1*a*.

Under the driving of the servo motor 100*c*, a blow-out port door 1*c* is switched from a first switching position (a position indicated by a solid line of FIG. 1) to a second switching position (a position indicated by the broken line of FIG. 1) in a defrosting mode to open an opening portion 5*c*, so that air is blown out from the opening portion 5*c* mainly to the inner surface of the front wind shield.

Under the driving of the servo motor 100*b*, a blow-out port door 1*e* is switched from a first switching position (a position indicated by a solid line of FIG. 1) to a second switching position (a position indicated by a broken line of FIG. 1) in a face mode to open an opening portion 5*e*, thereby blowing out air from the opening portion 5*e* to the upper half bodies of passengers in the vehicle.

Under the driving of a servo motor 100*a*, a blow-out port door 1*d* is switched from a first switching position (a position indicated by a solid line of FIG. 1) to a second switching position (a position indicated by a broken line of FIG. 1) in a foot mode to open an opening portion 5*d*, thereby blowing out air from the opening portion 5d to the lower half bodies of the passengers in the vehicle.

In a bi-level mode, each of the blow-out port doors 1e and 1d is switched to the second switching position to open both the opening portions 5d and 5e. Doors 1a to 1e are formed of resin or the like in the shape of a plate. In order to discriminate the blow-out port doors 1c, 1d and 1e from one another, they will be referred to as a defrosting blow-out port door 1c, a foot blow-out port door 1d and a face blow-out port door 1e, respectively.

Figure 2:
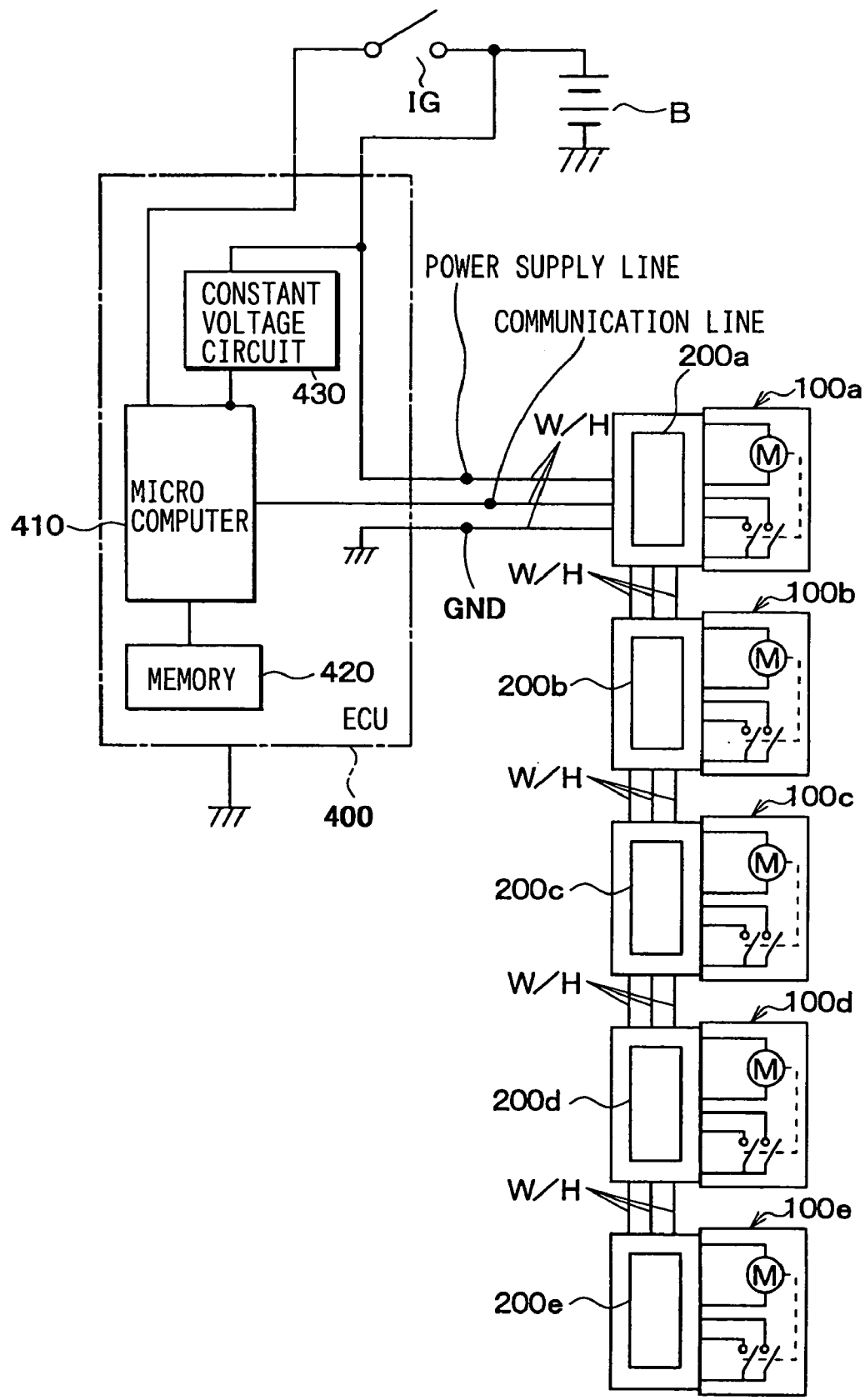
FIG. 2 is a diagram showing a connecting construction of an electrical control unit and control circuits shown in FIG. 1.

The vehicle air conditioner includes an electrical control unit (ECU) 400. Referring to FIG. 2, the ECU 400 comprises a memory 420, a microcomputer 410 and a constant voltage circuit 430. The microcomputer 410 controls the servo motors 100a to 100e through the control circuits 200a to 200d. As shown in FIG. 1, the microcomputer 410 also controls the blower motor 9a in accordance with in-vehicle temperature detected by an indoor air temperature sensor S1, in-vehicle light radiation intensity detected by a radiation sensor S2, outdoor temperature (temperature outside the vehicle) detected by an outdoor temperature sensor S3, set temperature output from a temperature setter Re which is set by a passenger or the like, etc.

Each of the control circuits 200a to 200d is equipped to a corresponding servo motor to control the corresponding servo motor as described later. The electrical control unit 400 and the servo motors 100a to 100e are connected to one another through a communication line, a power supply line and a ground line.

Returning to FIG. 2, the storage unit (memory) 420 comprises a ROM for storing computer programs, etc., RAM for storing data generated through the processing of the microcomputer 410, and etc. The constant voltage circuit 430 converts a voltage output from an in-vehicle battery B to a constant voltage and outputs it to the microcomputer 410, etc.

Next, the construction of the servo motors 100a to 100e will be described with reference to FIGS. 3 to 7.

Here, the servo motors 100a to 100e have substantially the same construction except that the doors to be driven and the movable ranges of the doors are individually different from one another, and thus the construction of the servo motor 100d will be representatively described as an example of the servo motors 100a to 100e.

Figure 3:
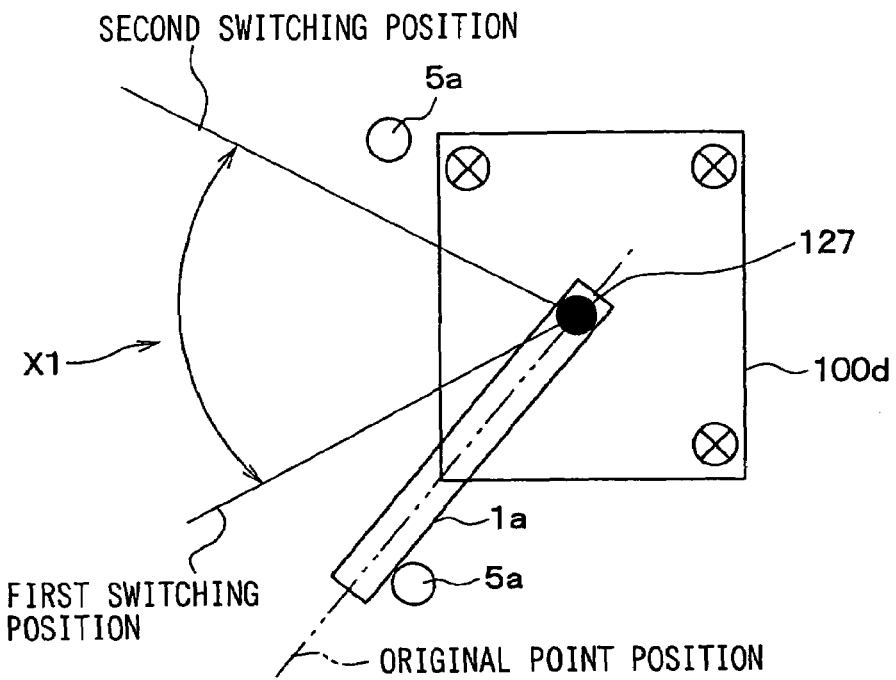
FIG. 3 is a diagram showing the outline of a servo motor of FIG. 1.
Figure 4:
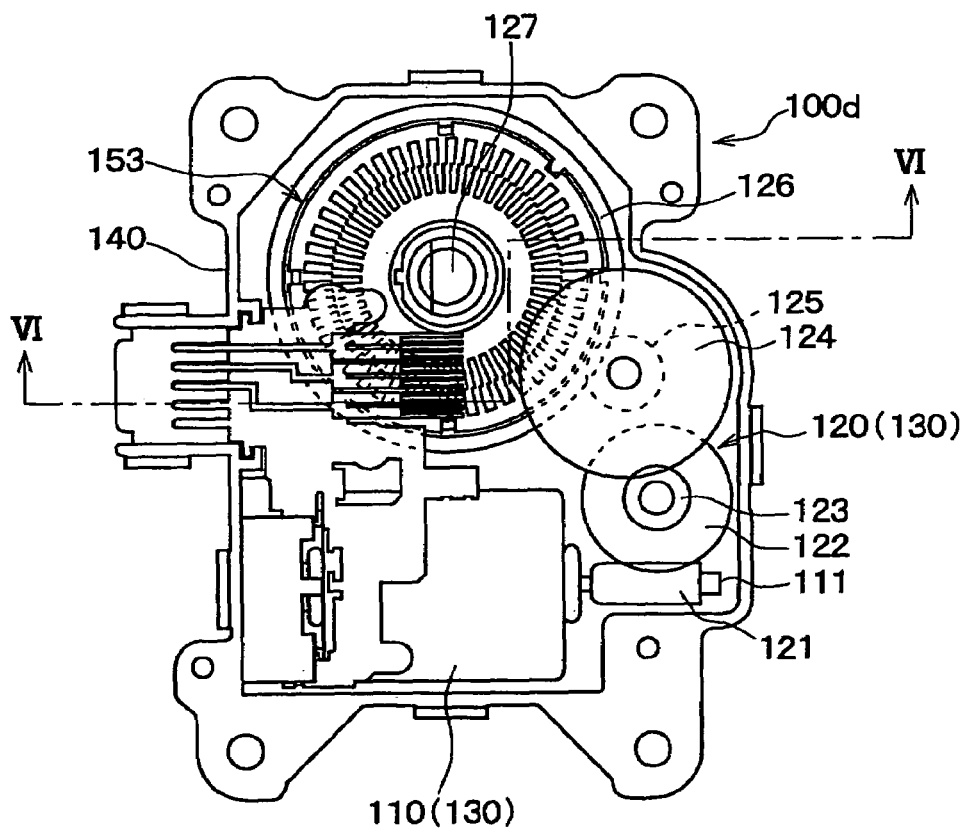
FIG. 4 is a diagram showing schematic construction of a servo motor of FIG. 1.
Figure 5A:
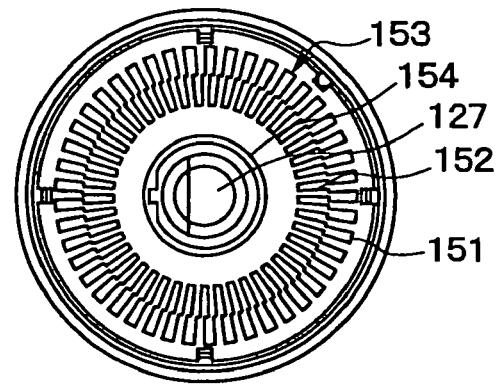
FIG. 5A is a front view of a pulse plate of FIG. 4.
Figure 5B:
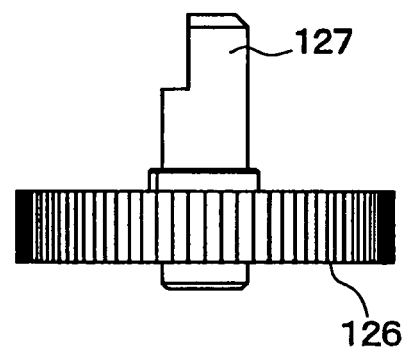
FIG. 5B is a side view of FIG. 5A.
Figure 6:
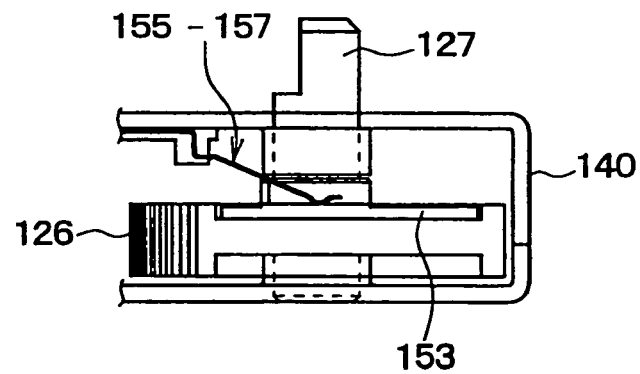
FIG. 6 is a cross-sectional view of FIG. 5A.
Figure 7:
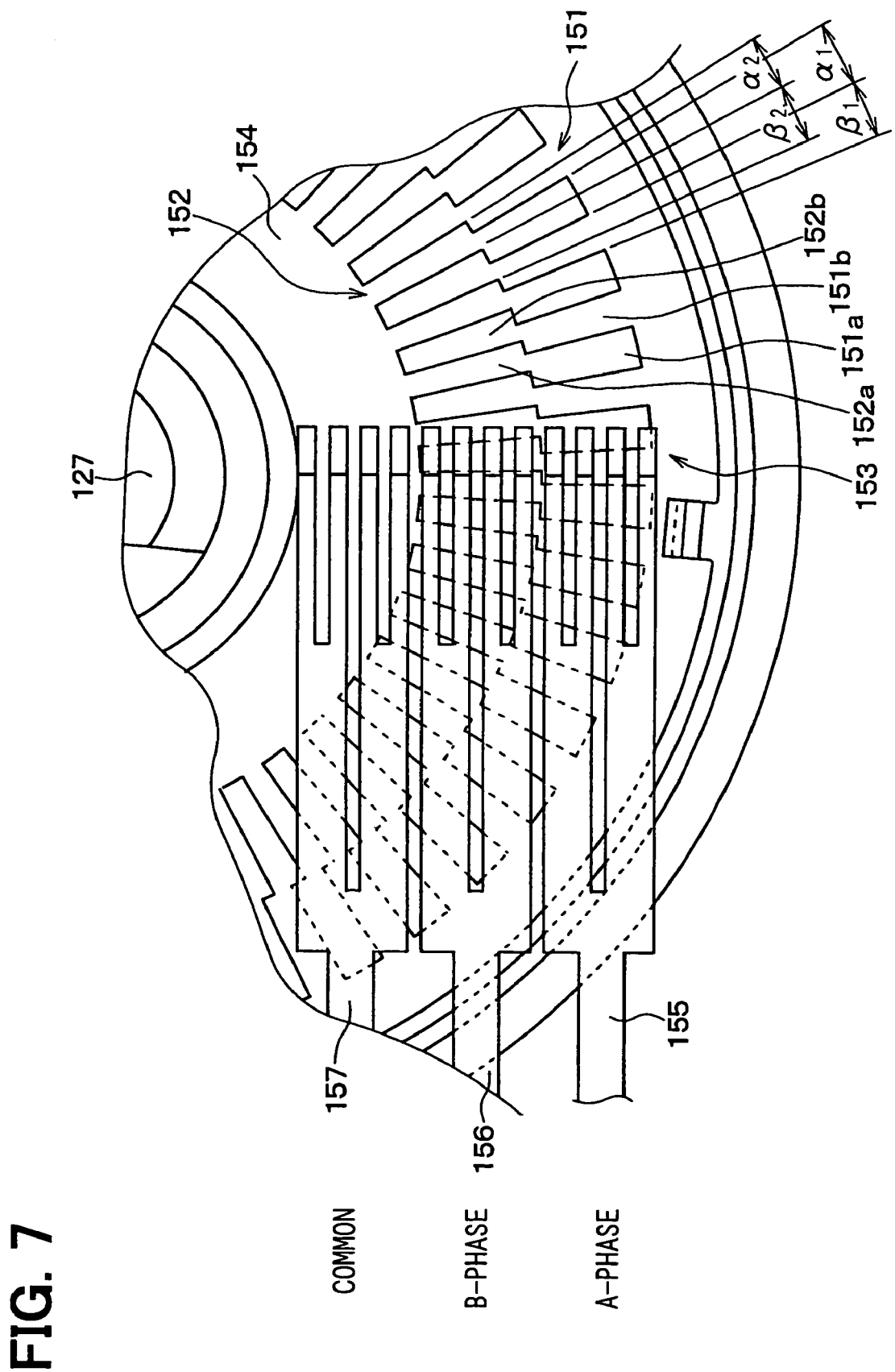
FIG. 7 is an enlarged view of the pulse plate of FIG. 5A.

FIG. 3 is a diagram showing the outlook of the servo motor 100d, and FIG. 4 is a diagram showing the construction of the servo motor 100d. In FIG. 4, a DC motor 110 is supplied with power from the in-vehicle battery B to rotate an output shaft 111. A deceleration mechanism 120 is a transmission mechanism for decelerating rotational force input from the DC motor 110 and outputting the rotational force thus decelerated to the air mix door (A/M door) 1a. The rotationally driving mechanism portions such as the DC motor 110 and the deceleration mechanism 120 will be hereinafter referred to as "driving portions 130."

The deceleration mechanism 120 is a gear sequence comprising a worm 121 press-fitted in the output shaft 111 of the DC motor 110, a worm wheel 122 engaged with the worm 121 and plural spur gears 123, 124 and 125, and an output shaft 127 that is equipped to a final-stage gear located at the output side (output-side gear) 126.

The casing 140 is a casing in which the driving portions 130 are accommodated and to which brushes (electrical contact points) 155 to 157 described later are fixed.

As shown in FIGS. 5A to 7 (particularly, see FIG. 7), a pulse pattern plate (hereinafter referred to as "pattern plate") 153 is equipped at an output side (output shaft 127) from an input gear (worm 121) which is directly driven by the DC motor 110. The pattern plate 153 is equipped with first and second pulse patterns 151 and 152 comprising conductive portions 151a (152a) and non-conductive portions 151b (152b) which are alternately arranged in the circumferential direction, and rotated integrally with the output shaft 127.

In this case, the circumference angle α1 (α2) of the conductive portions 151a (152a) and the circumference angle β1 (β2) of the non-conductive portions 151b (152b) are set to be equal to each other, and the phase of the first pulse pattern 151 is set to be displaced from the phase of the second pulse pattern 152 by substantially a half of the circumference angle α1, α2 (=circumference angle β1, β2).

The first and second pulse patterns 151 and 152 are electrically connected to each other. The first and second pulse patterns 151 and 152 are electrically connected to a common pattern (common conductive portion pattern) 154 equipped at a more inner peripheral side than both the pulse patterns 151 and 152 and thus electrically connected to the cathode side of a battery (not shown) through a brush 157 described later.

On the other hand, first to third brushes (electrical contact points) 155 to 157 formed of copper type conductive material which are connected to the anode side of the battery are fixed to the casing 140 side by resin integral molding. The first brush 155 is brought into contact with the first pulse pattern 151, the second brush 156 is brought into contact with the second pulse pattern 152, and the third brush 157 is brought into contact with the common pattern 154.

In this embodiment, by setting the number of the contact points of the first to third brushes 155 to 157 and the pattern plate 153 to two or more (in this embodiment, four contact points), the electrical connection of the first to third brushes 155 to 157 and the conductive portions 151a and 152a (containing the common pattern 154) is securely maintained.

As shown in FIG. 3, the air mix door 1a is press-fitted in the output shaft 127, and the air mix door 1a is rotated between stoppers 5a and 5b in connection with rotation of the output shaft 127. The stoppers 5a and 5b are equipped so as to project from the air conditioning case 5 so that the air mix door 1a is made to abut against the stoppers 5a and 5b to thereby set a control range X1 of the output shaft 127.

Next, the operation of the servo motor 100d will be described with reference to FIGS. 8 to 10.

Figure 8:
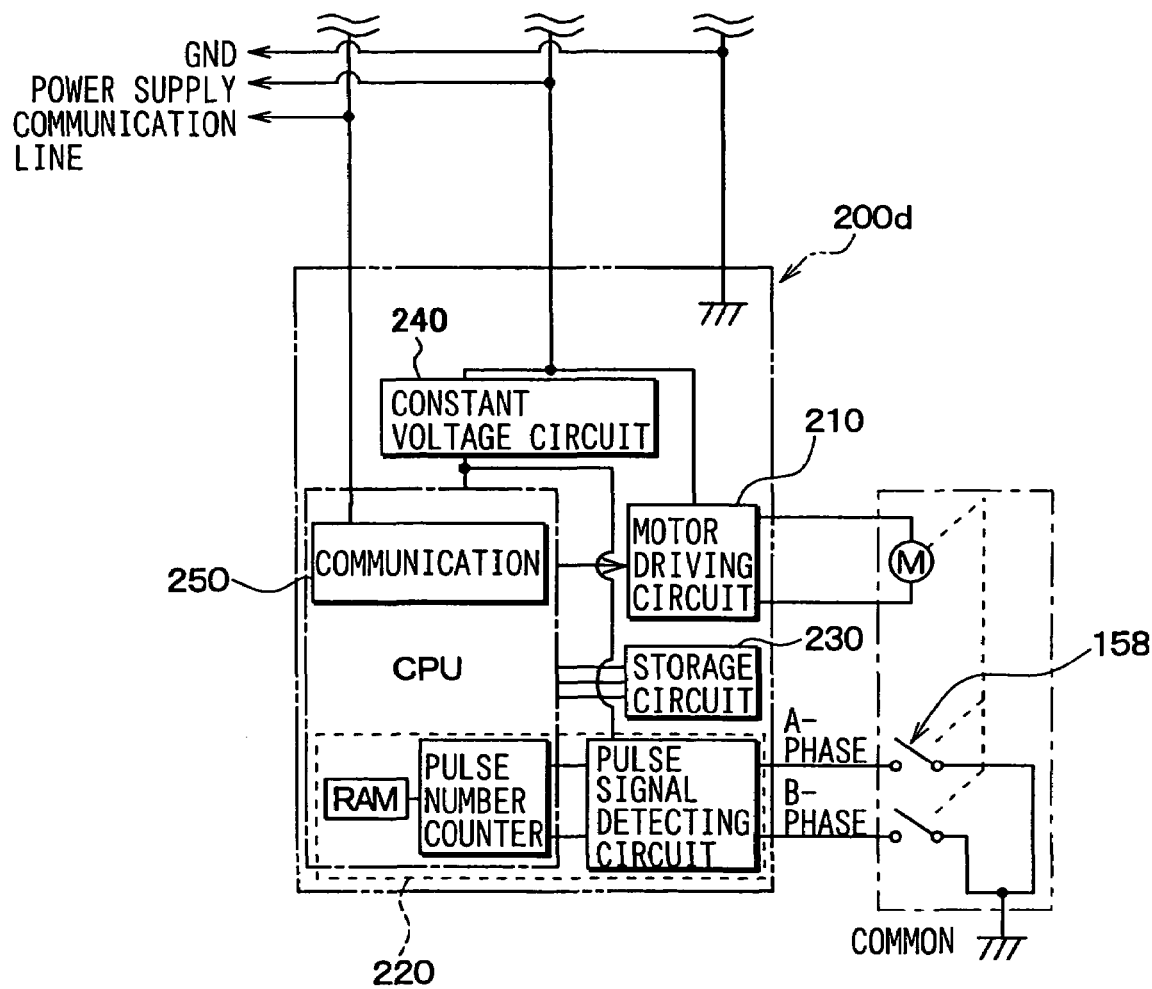
FIG. 8 is a diagram showing the construction of a servo motor 100*e* of FIG. 1.

FIG. 8 is a schematic diagram showing the control circuit 200d of the servo motor 100d. The control circuit 200d comprises a motor driving circuit 210 for driving the DC motor 110, a rotational angle detector (rotational angle detecting unit) 220 for detecting the rotational angle of the output shaft 127 and the direction of the rotation on the basis of the pulse signals occurring at the pattern plate 153, a storage circuit 230 which can hold input information with no power supply, such as a flash memory for storing various kinds of control information and a communication circuit 250 which communicates with the electrical control unit 400 through a communication line.

When the DC motor 110 rotates and thus the output shaft 127 (pattern plate 153) is rotated, the conduction (ON) state under which the first and second brushes 155 and 156 are brought into contact with the conductive portions 151a and 152a, and also the non-conduction (OFF) state under which the first and second brushes 155 and 156 are brought into contact with the non-conductive portions 151b and 152b occur mutually periodically.

Accordingly, pulse signals occur at the first and second brushes 155 and 156 every time the DC motor 110 rotates by a predetermined angle. According to this embodiment, the first and second brushes 155 and 156 and the pattern plate 153 constitute the pulse generator (pulse generating unit) 158 (see FIG. 8) for emitting pulse signals every time the output shaft 127 is rotated by a predetermined angle.

Since the first pulse pattern 151 and the second pulse pattern 152 are displaced from each other in phase, a two-phase pulse signal (hereinafter referred to as "A-phase pulse") generated by the first pulse pattern 151 and the first brush 155 and a two-phase pulse signal (hereinafter referred to as "B-phase pulse") which is generated by the second pulse pattern 152 and the second brush 156 and displaced from the A-phase pulse in phase are generated in the pulse generator 158.

Therefore, according to this embodiment, the direction of the rotation of the DC motor 110 (output shaft 127) is detected on the basis of which one of the A-phase pulse and the B-phase pulse is preferentially input to the rotational angle detector 220.

As shown in FIG. 9, when the DC motor 110 is rotated in a plus count direction, the state of the A-phase pulse and the B-phase pulse is periodically switched in the following order: [0,1]→[1,1]→[1,0]→[0,0]→[0,1]→ . . . On the other hand, when the DC motor 110 is rotated in a minus count direction, the state of the A-phase pulse and the B-phase pulse is periodically switched in the following order: [1,1]→[0,1]→[0,0]→[1,0]→[1,1]→ . . .

Therefore, the rotational angle detector 220 renews the present position of the output shaft 127 on the basis of the switching of the A-phase and B-phase pulse state. Specifically, the present position is incremented one by one every time the state of the A-phase pulse and the B-phase pulse is switched in the following order: [0,1]→[1,1]→[1,0]→[0,0]→[0,1]→ . . . On the other hand, the present position is decremented one by one every time the state of the A-phase pulse and the B-phase pulse is switched in the following order: [1,1]→[0,1]→[0,0]→[1,0]→[1,1]→ . . . That is, the variation of the pulse state of the A-phase pulse and the B-phase pulse is counted, and the count value thus achieved is determined as the present position.

Here, the count value indicating the present position is represented by a binary code. Therefore, assuming that the lower two digits of the present position is equal to [00] when the state of the A-phase and B-phase pulses is equal to [0,1] as shown in FIG. 10, when the state of the A-phase and B-phase pulses is shifted to [1,1], the lower two digits of the present position is renewed to [0,1]. "The lower two digits of the present position" corresponds to "the predetermined digits at the lower side of the fifth aspect of the present invention".

Furthermore, when the state of the A-phase and B-phase pulses is shifted to [1,0], the lower two digits of the present position is renewed to [10], and then when the state of the A-phase and B-phase pulses is shifted to [0,0], the lower digits of the present position is renewed to [11]. Thereafter, when the state of the A-phase and B-phase pulses is returned to [0,1], the lower two digits of the present position is equal to [00].

As described above, when the state of the A-phase and B-phase pulses is changed in the following order: [0,1]→[1,1]→[1,0]→[0,0]→[0,1], the lower two digits of the present position is changed in the following order: [00]→[11]→[10]→[00]→[00]). Accordingly, the one-to-one corresponding relationship is established between the state of the A-phase and B-phase pulses and the lower two digits of the present position.

FIG. 10 is a table showing the corresponding relationship between the state of the A-phase and B-phase pulses and the lower two digits of the binary code indicating the present position.

When receiving the target stop position from the electrical control unit 400 and starting the driving of the output shaft 127 of the servo motor 100d, the control circuit 200d renews the present position of the output shaft 127 in accordance with the state of the A-phase and B-phase pulses, stores the renewed present position into the storage circuit 230 and stops power supply to the servo motor 100d when the target stop position and the present position are coincident with each other, thereby stopping the servo motor 100d. Accordingly, the servo motor 100d rotates the indoor/outdoor air switching door 1b to one of the first and second switching positions.

Furthermore, the control circuit 200d has a function of initializing the servo motor 100d (corresponding to the initializing unit of the eighth aspect of the present invention). With the initializing function, the output shaft 127 of the servo motor 100d is rotated in the minus count direction for a fixed period, and then it is judged that the door is stopped by the stopper 5a when variation of the amplitude of the A-phase and B-phase pulses is stopped. At this time, the location of the output shaft 127 at the original-point position is stored in the storage circuit 230.

Figure 12:
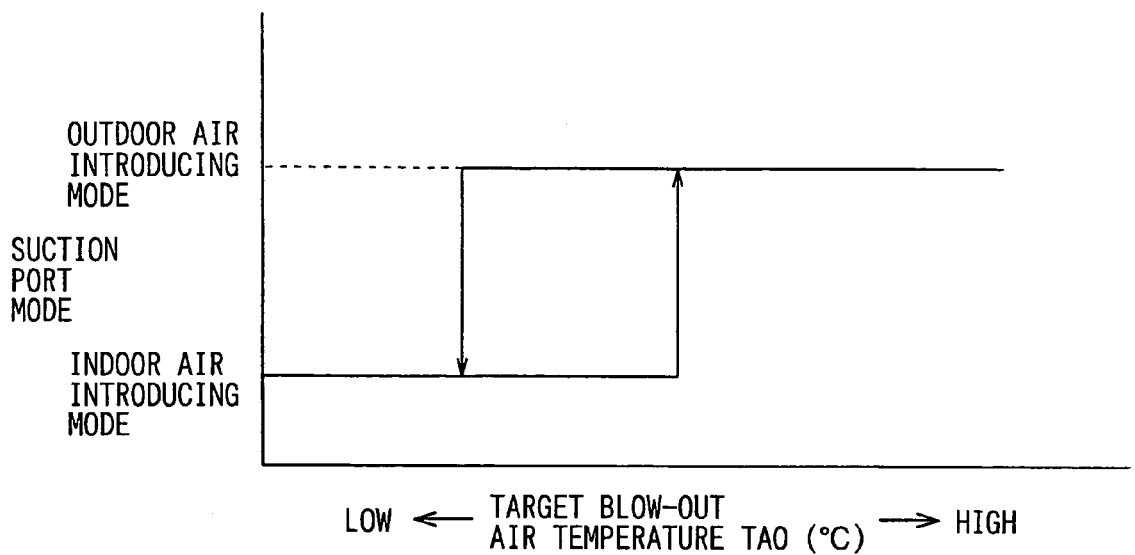
FIG. 12 is a characteristic diagram to determine a suction port mode.
Figure 13:
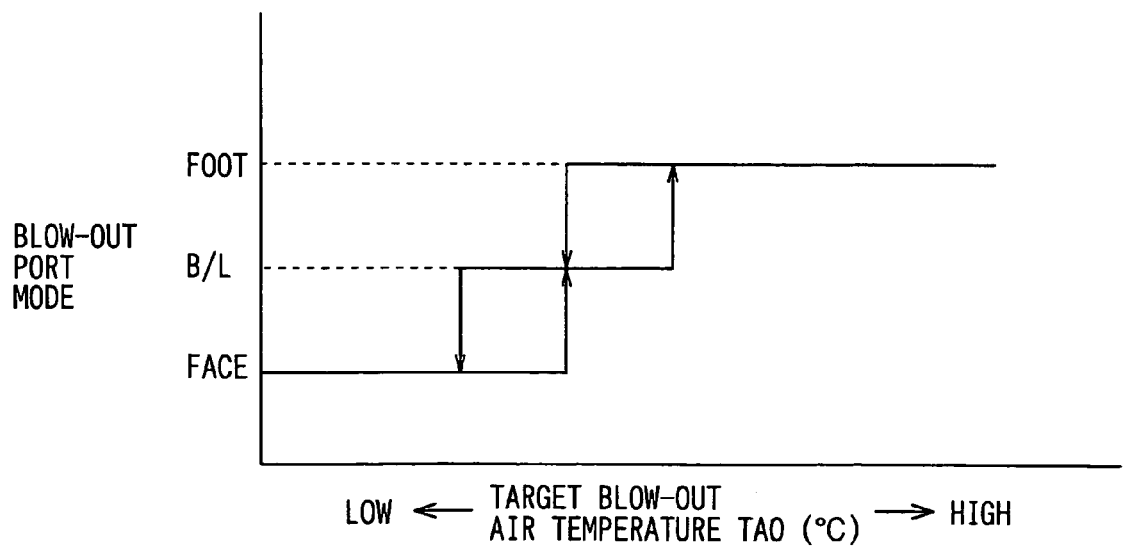
FIG. 13 is a characteristic diagram to determine a blow-out port mode.

Next, the operation of this embodiment will be described with reference to FIGS. 11 to 14. FIG. 11 is a flowchart showing the control processing of a microcomputer 410 of the electrical control unit 400. FIG. 12 is a flowchart showing the details of the control processing of the microcomputer 410 for every servo motor. FIG. 13 is a flowchart showing the details of position displacement judgment processing (S102) in FIG. 12.

The microcomputer 410 executes a computer program stored in a memory 420 according to the FIGS. 11 to 13. The computer program is repeated every fixed period when an ignition switch IG is turned on. The ignition switch IG is a switch for allowing power supply from a battery B to the microcomputer 410 when a passenger operates the ignition switch IG.

Respective target stop positions of the output shafts 127 of the servo motors 100a to 100e are first calculated (S90).

The microcomputer 410 reads in output signals from an indoor temperature sensor S1 for detecting indoor temperature (room temperature) Tr in the room of the vehicle, a solar radiation sensor S2 for detecting the intensity of solar radiation Ts irradiated into the room of the vehicle, an outdoor temperature sensor S3 for detecting outdoor temperature (ambient temperature) Tam at the outside of the vehicle, a setter Re for setting set temperature Tset in the room of the vehicle as a control target and manually setting a blow-out mode, etc. by a passenger, etc. Tr, Ts, Tam, Tset thus set are input into an equation 1 stored in advance to determine target blow-out air temperature TAO.

$$TAO = Kest \cdot Tset - Kr \cdot Tr - Kam \cdot Tam - Ks \cdot Ts + CF \quad \text{equation 1}$$

Kest, Kr, Kam, and Ks represent the gains of the output signals of the respective sensors, and C represents a constant.

Here, a target opening degree θo of the air mix door 1a is calculated on the basis of the target blow-out air temperature TAO, engine cooling water temperature Tw and exit temperature Te by using the following equation 2 stored in the memory 420 in advance.

$$\theta o = \{(TAO - Te)/(Tw - Te)\} \times 100 (\%) \quad \text{equation 2}$$

Here, when a passage through which an air stream flows into the heater core 3 is fully closed, the target opening degree θo is set to 0%. On the other hand, when a passage bypassing the heater core 3 is fully closed, the target opening degree θo is set to 100%. The target stop position of the output shaft 127 of the servo motor 100*a* is calculated on the basis of the target opening degree θo.

Here, the target opening degree θo of the air mix door 1*a* and the target stop position are associated with each other in one-to-one correspondence, and a corresponding table indicating the corresponding relationship between the target opening degree θo and the target stop position is stored in the memory 420 in advance. The target stop position is selected on the basis of the corresponding table thus stored.

Subsequently, on the basis of the target blow-out air temperature TAO, it is determined from the characteristic diagram of FIG. 13 pre-stored in the memory 420 which one of the indoor air introducing mode and the outdoor air introducing mode should be set as a suction port mode.

Here, the suction port mode and the target stop position of the output shaft 127 of the servo motor 100*e* are associated with each other in one-to-one correspondence, and a corresponding table indicating the corresponding relationship between the suction port mode and the target stop position is stored in the memory 420 in advance. The target stop position of the output shaft 127 of the servo motor 100*e* is selected on the basis of the corresponding table thus stored.

Subsequently, on the basis of the target blow-out air temperature TAO, it is determined from the characteristic diagram of FIG. 13 pre-stored in the memory 420 which one of the face mode (FACE), the bi-level mode (B/L) and the foot mode (FOOT) should be executed as the blow-out port mode. When the defrosting mode is manually set as the blow-out port mode by the setter Re, it is determined that the defrosting mode thus set is executed as the blow-out port mode. As described, any one of the face mode, the bi-level mode, the foot mode and the defrosting mode is determined to be executed as the blow-out port mode.

The blow-out port mode and the target stop position of the output shaft 127 of each of the servo motors 100*a* to 100*c* are associated with each other in one-to-one correspondence. A corresponding table indicating the corresponding relationship between the blow-out port mode and the target stop position of the output shaft 127 of each of the servo motors 100*a* to 100*c* is stored in the memory 420 in advance, and the target stop position of the output shaft 127 of each of the servo motors 100*a* to 100*c* is selected on the basis of the corresponding table thus stored.

As described above, the respective target stop positions of the servo motors 100*a* to 100*e* are determined.

Subsequently, the microcomputer 410 carries out the transmission/reception processing with the respective control circuits 200*a* to 200*d* in a time-division style (S91 to S95).

Figure 14:
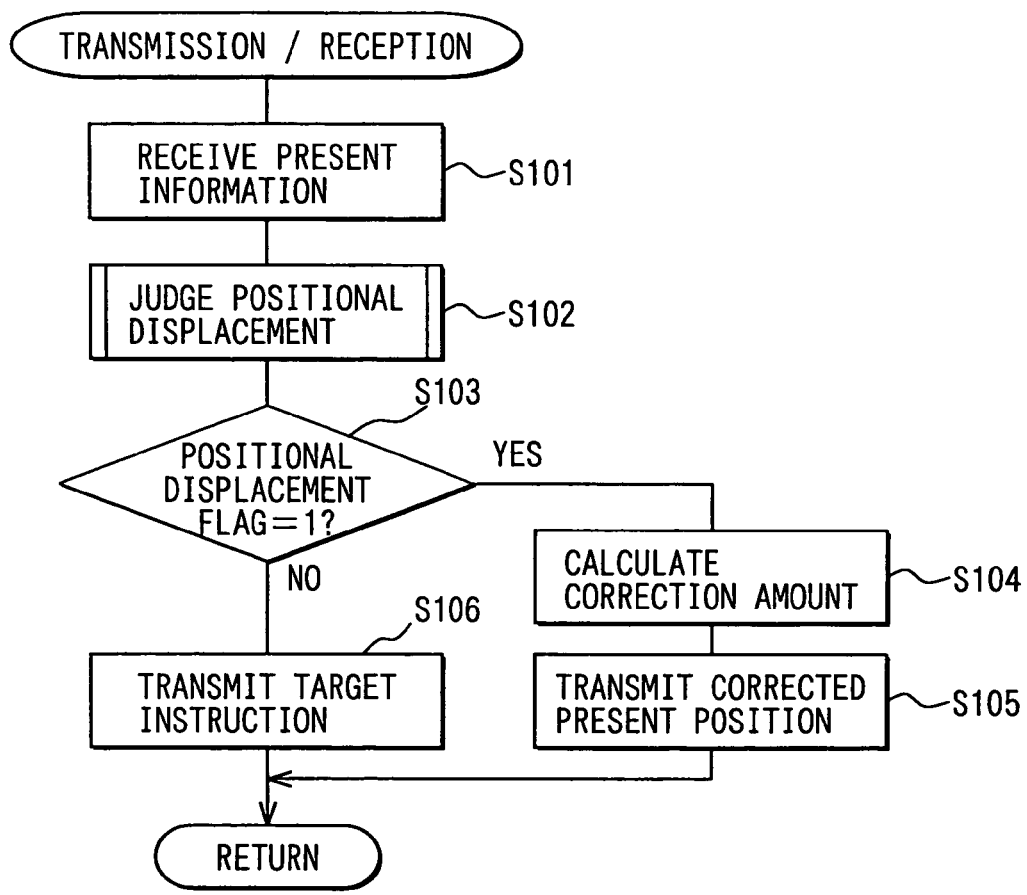
FIG. 14 is a flowchart showing the details of a part of transmission/reception processing of FIG. 11.

First, the transmission/reception processing between the microcomputer 410 and the control circuit 200*a* will be described with reference to the control flowchart of FIG. 14. Present information containing the present position and the pulse state of the A-phase and B-phase pulses is received from the control circuit 200*a* (S101) to judge whether a positional displacement of the present position occurs.

In this judgment step, it is judged whether any displacement occurs between the present position of the output shaft 127 of the servo motor 100*a* which is recognized by the control circuit 20*a* and the actual present position of the output shaft 127. In other words, it is judged whether the present position of the output shaft 127 which is stored in the control circuit 200*a* is abnormal or not. The details of the positional displacement judgment processing concerned (S102) will be described later.

When a positional displacement flag described later is reset in the memory 420 (positional displacement flag=0), it is judged that no positional displacement occurs, and thus "NO" is judged in the judgment step of S103. In this case, immediately after the judgment, the target stop position of the output shaft 127 of the servo motor 100*a* is transmitted to the control circuit 200*a* while the communication with the other control circuits 200*b* to 200*d* is stopped (S106). In connection with this transmission, the control circuit 200*a* drives the air mix door 1*a* to the target stop position by the servo motor 100*d*.

"Control circuits 200*b* to 200*d*" corresponds to "the other control circuits than the control circuit corresponding to the present position concerned out of the plural control circuits" of the second aspect of the present invention.

Furthermore, when the positional displacement flag is set (positional flag=1) in the memory 420, it is judged that some positional displacement occurs, and thus a correction amount for the present position is determined on the basis of the data stored in the memory 420 in advance (see the table of FIG. 16), the present position and the present pulse state of the A-phase and B-phase pulses (S104).

Here, FIG. 16 is a table showing the lower two digits of the present position, the present pulse state of the A-phase and B-phase pulses and the correction amount which are associated with one another in one-to-one correspondence. On the basis of this table, one of −1, ±0, +1, +2 is determined as the correction amount of the present position.

For example, when the lower two digits of the present position is equal to [00] and the present pulse state of the A-phase and B-phase pulses is equal to [0][1], no positional displacement occurs and the present position is normal. Therefore, the correction amount is [±0].

On the other hand, when the lower two digits of the present position is equal to [00] and the pulse state of the A-phase and B-phase pulses is equal to [0][0], some positional displacement occurs and the present position is abnormal. Therefore, the correction amount is equal to [−1]. The correction amount thus selected is added to the present position to correct the present position, and the present position thus corrected is transmitted to the control circuit 200*a*.

At this time, the control circuit 200*a* stores the present position thus transmitted into the storage circuit 230, and also drives the output shaft 127 of the servo motor 100*a* to the target stop position on the basis of the present position thus stored.

Figure 15:
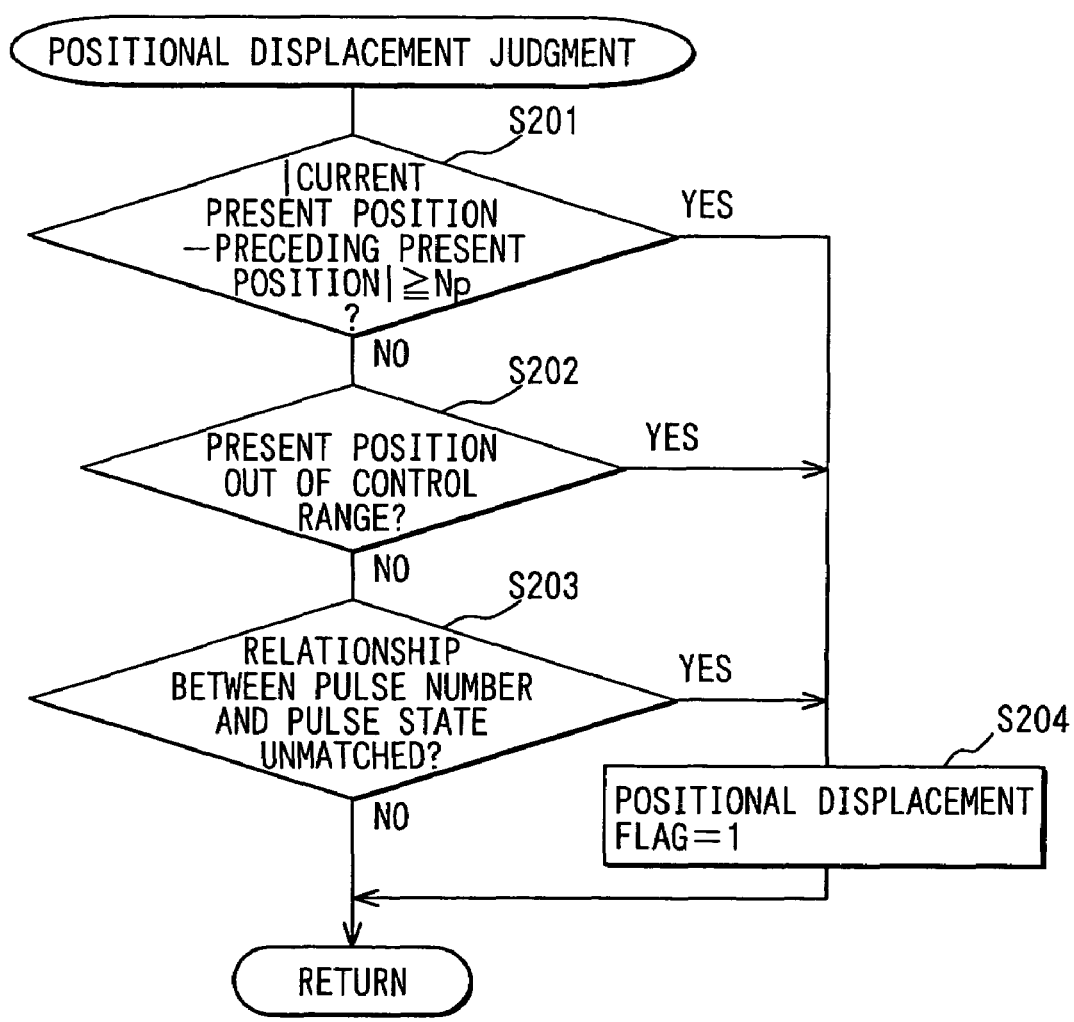
FIG. 15 is a flowchart showing the details of the processing of a part of FIG. 14.

Next, the positional displacement judgment processing (S102) described above will be described with reference to the control flowchart of FIG. 15.

Here, when the absolute value of the difference between the current present position and the preceding present position greater than or equal to a range Np, it is judged that some positional displacement occurs, and thus the positional displacement flag is set (S204).

On the other hand, when the absolute value of the difference between the current present position and the preceding present position is not greater than or equal to the range Np, it is judged whether the present position is out of a predetermined control range X1 of the output shaft 127. If the present position is out of the control range X1 of the output shaft 127, it is judged that some positional displacement occurs, and thus the positional displacement flag is set (S204).

Furthermore, if the present position is within the predetermined control range X1 of the output shaft 127, on the basis of the data (see a table of FIG. 10) pre-stored in the memory 420, it is judged from the relationship between the lower two digits of the present position and the present pulse state of the A-phase and B-phase pulses whether any positional displacement occurs. FIG. 10 is a table showing the one-to-one relationship between the lower two digits of the normal present position and the pulse state of the A-phase and B-phase pulses when positional displacement does not occur.

For example, if the currently-received present position and the lower two digits of the present position satisfy the relationship of the table shown in FIG. 10, it is judged that no positional displacement occurs. On the other hand, if the currently-received present position and the lower two digits of the present position do not satisfy the relationship of the table shown in FIG. 10, it is judged that positional displacement has occurred (that is, the present position is abnormal), and thus the positional displacement flag is set.

When the microcomputer carries out the transmission/reception processing with the control circuit 200a as described above, it carries out the transmission/reception processing with each of the control circuits 200b, 200c, 200d and 200e in the time-divisional style as in the case of the transmission/reception processing with the control circuit 200a.

Therefore, as in the case of the control circuit 200a, the positional displacement judgment processing of the present position of the output shaft 127, the correction processing of the present position, the transmission processing of the target stop position, etc. are carried out between the microcomputer and each of the control circuits 200b to 200e.

Therefore, each of the control circuits 200b to 200e rotates the output shaft 127 of the corresponding servo motor of the servo motors 100b to 100e to the target stop position. Accordingly, each of the servo motors 100b to 100e rotates the corresponding door to one of the first and second switching positions. Thereafter, the processing is returned to the target calculation (S90), and the processing of S90 to S95 is periodically carried out.

Next, the ground for determining the range Np will be described. When the period of the control processing shown in FIG. 11 is represented by T, the maximum movement amount (=Smax X T) of the air mix door 1a is determined by one period on the basis of the maximum value Smax of the rotational speed of the air mix door 1a by the servo motor 100d and the period T.

The maximum movement amount thus determined is set as the range Np. Therefore, on the basis of a judgment as to whether (|the current present position—preceding present position|) exceeds the range Np or not, it can be judged whether any positional displacement occurs or not.

Here, when some positional displacement occurs as described above and thus the positional displacement flag is set, the ignition switch IG is turned off, and actuation of initialization is instructed to the control circuit corresponding to the servo motor in which the positional displacement occurs after the air conditioning operation of the air conditioning unit 50 is stopped. As described above, "the function of instructing actuation of the initialization" corresponds to "the instructing unit" in the eleventh aspect.

Therefore, the control circuit rotates the output shaft 127 of the servo motor in the minus count direction for a fixed period. Thereafter, when variation of the amplitude of the A-phase and B-phase pulses is stopped, it is judged that the door is stopped by the stopper 5a. In connection with this judgment, power supply to the servo motor is stopped, and it is stored in the storage circuit 230 that the door is located at the original point position.

Next, the action and effect of this embodiment will be described. That is, the electrical control unit 400 of this embodiment detects the present positions of the output shafts 127 of the servo motors (actuators) 100a to 100e, and communicates with the control circuits 200a to 200e for driving the respective output shafts 127 to the target stop positions on the basis of the respective present positions thus detected.

Before the control circuits 200a to 200e drive the corresponding servo motors 100a to 100e, the electrical control device 400 receives the respective present positions from the control circuits 200a to 200e, and judges whether each of the present positions thus received is abnormal or not.

Here, when it is judged that the present position of the servo motor 100a out of the present positions thus received is abnormal, the present position concerned is corrected, and the corrected present position is transmitted to the control circuit 200a corresponding to the present position concerned out of the control circuits 200a to 200e.

As described above, when some present position is judged to be abnormal, the electrical control unit 400 corrects the present position concerned and transmits the corrected present position to the control circuit 200a concerned. Therefore, the control circuit 200a concerned can eliminate the abnormality of the present position, and can normally drive the output shaft 127 of the servo motor 100a to the target stop position on the basis of the corrected present position. Therefore, the uncontrollability of the servo motor 100a can be prevented in advance.

Furthermore, in this embodiment, when judging that the present position of the servo motor 100a is normal, the electrical control unit 400 transmits the target stop position to the control circuit 200a corresponding to the present position concerned immediately after the above judgment, so that the control circuit 200a concerned can quickly drive the output shaft 127 of the servo motor 100a to the target stop position.

Still furthermore, in this embodiment, when it is judged that some positional displacement occurs in the output shaft 127 of the servo motor 100a, the control circuit 200a is instructed to actuate initialization of the servo motor 100a not immediately after the above judgment, but after the air conditioning operation of the air conditioning unit 50 is stopped. Therefore, the control circuit 200a initializes the servo motor 100a after the air conditioning operation of the air conditioning unit 50 is stopped. Accordingly, it can be prevented in advance that the operation of the air conditioning unit 50 is temporarily stopped during the air conditioning operation thereof and thus a user feels uncomfortable.

(Other Embodiments)

In the above-described embodiment, the doors 1a to 1e are made to impinge against the stoppers 5a so that the position at which the rotation of each of the servo motors 100a to 1003 is mechanically stopped is stored at the original point position, and thereafter the servo motors 100a to 100e are controlled with the original point positions as operating references. However, the servo motors 100a to 100e may be controlled with positions displaced from the original point positions as operating references.

In the above-described embodiment, the present invention has been described by using the sliding contact type positional detecting device, however, the present invention is not limited to this embodiment. The present invention is applicable to other position detecting devices such as an optical encoder.

In the above-described embodiment, the pulse generator 158 is equipped to the output shaft 127. However, the present invention is not limited to this embodiment, and a further decelerated rotating portion may be equipped for the pulse generator 158 (pulse plate 153) to generate pulse signals.

In the above-described embodiment, the present invention is applied to the vehicle air conditioner. However, the present invention is not limited to the vehicle air conditioner.

In the above-described embodiment, the rotation of each of the servo motors 100a to 100e is mechanically stopped at the original point position. However, the present invention is not limited to this embodiment, and for example the power supply to the servo motors may be stopped so that the rotation of each of the servo motors 100a to 100e is stopped at the original point position.

In the above-described embodiment, each of the servo motors 100a to 100e using the DC motor 110 is used as actuators. However, the present invention is not limited to this embodiment, and the present invention is applicable to an actuator having a stepping mechanism for rotating the output shaft on the basis of an input pulse signal every fixed angle.

In this case, the present position of the output shaft 127 can be estimated by merely counting input pulse signals, and thus it is unnecessary to equip a mechanism for detecting the position of the output shaft 127 as described above.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An actuator control device for controlling the positions of a plurality of output shafts, comprising:
   a plurality of actuators for respectively driving the plurality of output shafts by a motor;
   a plurality of control circuits, each control circuit including a count value representing a present position of a respective output shaft, the control circuits respectively driving the output shafts to respective target stop positions based on the present positions; and
   an electrical control unit which carries out multiplex communications with the control circuits through a multiplex communication line, wherein the electrical control unit comprises a receiving unit for receiving a present pulse state from each of the plurality of control circuits through the multiplex communication line before the plurality of control circuits drive the respective actuators, a judging unit for judging whether each of the respective present pulse states thus received is abnormal or not by comparing each present pulse state to a respective count value, and a transmitting unit for correcting at least one present position when judged by the judging unit that the at least one present position is abnormal based on the comparison of the present pulse state to the respective count value, and transmitting the corrected present position to the control circuit corresponding to the abnormal present position through the multiplex communication line.

2. The actuator control device according to claim 1, wherein when the judging unit judges that at least one present position out of the received present positions is a normal present position, the transmitting unit transmits the target stop position to the control circuit corresponding to the normal present position while the multiplex communications with the control circuits other than the control circuit corresponding to the normal present position are stopped immediately after the judgment.

3. The actuator control device according to claim 1, wherein each of the plurality of actuators outputs two pulse signal sequences displaced in phase in connection with the driving of the respective output shaft thereof, and wherein each of the plurality of control circuits counts variation of the two pulse signal sequences output from the respective actuator to obtain the count value and determines the present position comprising the count value.

4. The actuator control device according to claim 3, wherein the receiving unit also receives a pulse state of the two pulse signals at the present time from each of the plurality of control circuits in addition to the present position, and on the basis of a relationship between the present position comprising the count value and the pulse state of the two pulse signals the judging unit makes a judgment as to whether the respective present positions received from the each of the plurality of control circuits are abnormal or not.

5. The actuator control device according to claim 4, wherein the electrical control unit includes therein a storage unit for storing the relationship between the pulse state of the two pulse signals and the value of a predetermined digit at a lower side of the count value indicating the present position when the present position is normal, and the judging unit judges whether the present position comprising the count value received from each of the plurality of control circuits and the pulse state of the two pulse signals satisfy the relationship indicated in the storage data of the storage unit, thereby judging whether present position information received from each control circuit is abnormal or not.

6. The actuator control device according to claim 3, wherein the receiving unit receives the present position comprising the count value from each of the plurality of control circuits every predetermined period, and when the difference between a currently-received present position from a prescribed control circuit out of the plurality of control circuits and a previously-received present position from the prescribed control circuit is larger than a fixed value, the judging unit judges that the currently-received present position from the prescribed control circuit is abnormal.

7. The actuator control device according to claim 6, wherein the judging unit periodically judges whether the difference between the currently-received present position from the prescribed control circuit out of the plurality of control circuits and the previously-received present position is larger than a predetermined value, and the predetermined value is determined on the basis of the predetermined period of the reception of the present position by the receiving unit and a maximum speed of the output shafts of the plurality of actuators.

8. The actuator control device according to claim 1, wherein when the present position received from a prescribed control circuit out of the plurality of control circuits is out of a predetermined range, the judging unit judges that the present position received from the prescribed control circuit is abnormal.

9. The actuator control device according to claim 4, wherein the actuator control device is equipped with a storage unit for storing data indicating the corresponding relationship of the value of a predetermined digit at a lower side out of the present position comprising the count value, the pulse state of the two pulse signals and a correction amount of the present position, and when the judging unit judges that the present position received from a prescribed control circuit out of the plurality of control circuits is abnormal, the transmitting unit determines the correction amount on the basis of the present position received from the prescribed control circuit, the pulse state of the two pulse signals and the data stored in the storage unit, corrects the present position comprising the count value on the basis of the correction amount thus determined and transmits the corrected present position to the prescribed control circuit.

10. The actuator control device according to claim 1, wherein the plurality of actuators drive a plurality of doors equipped to an air conditioning unit for air conditioning a room by driving the output shafts thereof.

11. The actuator control device according to claim 10, wherein each of the plurality of control circuits is equipped with an initializing unit for driving the output shaft of each actuator to an original position and storing in memory that the output shaft is located at the original position, and the actuator control device is equipped with an instructing unit for instructing a prescribed control circuit out of the plural control circuits to actuate the initializing unit after the air conditioning of the air conditioning unit is stopped when the judging unit judges that a specific present position out of the received present positions is abnormal.

12. The actuator control device according to claim 1, wherein:
 the plurality of control circuits are equipped to the plurality of actuators, respectively; and
 the electronic control unit is connected to the plurality of actuators through the time-divisional multiplex communication line, a power supply line and a ground line.

13. The actuator control device according to claim 3, wherein each of the actuators is equipped with a pulse pattern, wherein the pulse pattern plate includes first and second pulse patterns comprising conductive portions and non-conduction portions which are alternately arranged in the circumferential direction, wherein the pulse pattern plate is rotated integrally with the output shaft to output the two pulse signal sequences.

14. The actuator control device according to claim 13, wherein each of the plurality of control circuits comprises:
 a motor driving circuit for driving the motor;
 a rotational angle detector for detecting a rotational angle serving as the present position of the output shaft on the basis of pulse signals generated in the pulse pattern plate;
 a storage circuit for storing control information; and
 a communication circuit for communicating with the electrical control unit through the multiplex communication line.

15. The actuator control device according to claim 14, further comprising:
 a pulse generator comprised of first and second brushes and the pulse pattern plate, wherein the pulse generator generates the two pulse signal sequences every time the output shaft rotates by a predetermined angle,
 wherein the two pulse signals sequences comprise a two-phase first-phase pulse generated by the first pulse pattern and the first brush and a two-phase second-phase pulse generated by the second pulse pattern and the second brush and displaced in phase from the first-phase pulse in the pulse occur in the pulse generator, wherein the two-phase second-phase pulse is displaced in phase from the first-phase pulse.

16. An actuator control device for controlling the position of an output shaft, comprising:
 a control circuit for receiving from an actuator two pulse signal sequences displaced in phase, for counting variation of the two pulse signal sequences to obtain a count value and detect a present position of the output shaft, and for driving the output shaft to a target stop position based on the present position thus detected, wherein the present position thus detected comprises the count value;
 an electrical control unit for receiving a present pulse state from the control circuit through a multiplex communication line before the control circuit controls the actuator to drive the output shaft, for correcting the present position when judged to be abnormal, for transmitting the corrected present position to the control circuit through the multiplex communication line, for storing the relationship between a pulse state of the two pulse signals and a value of a predetermined digit at a lower side of the count value indicating the present position when the present position is normal in a storage unit;
 wherein the electrical unit judges whether the present position is abnormal by comparing the present position comprising the count value with the pulse state of the two pulse signals to determine if the relationship indicated in the storage data of the storage unit is satisfied;
 wherein the two pulse signal sequences include a pattern that is repeatedly switched in the following order $[0,1] \rightarrow [1,1] \rightarrow [1,0] \rightarrow [0,0]$;
 wherein the present position of the output shaft is renewed on the basis of a switching operation of the state of the two pulse signal sequences, and the count value serving as the present position is incremented by one every time the state of the two pulse signal sequences is changed.

17. The actuator control device according to claim 16, wherein the state of the two pulse signal sequences and the predetermined two digits of the digital value representing the count value have a predetermined corresponding relationship when the count value is a normal value.

18. The actuator control device according to claim 17, wherein the electrical control unit determines a correction amount for the present position of the output shaft by selecting from a table of correction amounts based upon storage data stored in the storage unit, wherein predetermined digits of the count value and the pulse state of the two pulse signal sequences are associated with one another in the storage data, wherein the correction amount is added to the present position comprising the count value to correct the present position, and the present position thus corrected is transmitted to the control circuit.

19. The actuator control device of claim 16, further comprising a plurality of the control circuits, each of the plurality of control circuits receiving from a respective actuator two pulse signal sequences displaced in phase, each of the plurality of control circuits counting variation of the two pulse signal sequences to obtain a count value and detect the present position of the output shaft and driving the respective output shaft to a target stop position based on the present positions thus detected,
 wherein the electrical control unit receives the present positions thus detected from each of the plurality of control circuits through the multiplex communication line before the each of the plurality of control circuits controls the respective actuator to drive the output shaft, wherein the electrical unit judges whether each of the present positions is abnormal by comparing the present position comprising the count value with the pulse state of the two pulse signals to determine if the relationship indicated in the storage data of the storage unit is satisfied.

* * * * *